(12) United States Patent
Monteiro (10) Patent No.: US 12,250,120 B2
(45) Date of Patent: Mar. 11, 2025

(54) VALIDATION OF COMPATIBILITY OF INDUSTRIAL GATEWAY DEVICES

(71) Applicant: Dell Products L.P., Round Rock, TX (US)

(72) Inventor: Marcio Barbosa Monteiro, Mallow (IE)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/097,320

(22) Filed: Jan. 16, 2023

(65) Prior Publication Data

US 2024/0243973 A1 Jul. 18, 2024

(51) Int. Cl.
*H04L 41/0873* (2022.01)
*H04L 69/08* (2022.01)
*H04L 12/66* (2006.01)

(52) U.S. Cl.
CPC .......... *H04L 41/0873* (2013.01); *H04L 69/08* (2013.01); *H04L 12/66* (2013.01)

(58) Field of Classification Search
CPC . H04L 43/18; H04L 41/0866; H04L 41/0869; H04L 41/0873; H04L 41/022; H04L 43/50; H04L 12/66; H04L 43/0882; H04L 43/0888; H04L 43/0894; H04L 43/16; H04L 43/0876; H04L 45/12; H04L 45/124; H04L 69/18; H04L 67/12; H04L 69/08
See application file for complete search history.

(56) References Cited

U.S. PATENT DOCUMENTS

| | | | | |
|---|---|---|---|---|
| 2008/0228503 | A1* | 9/2008 | Buchheit | G06Q 30/0603 235/375 |
| 2013/0318397 | A1* | 11/2013 | Jamison | G06F 8/63 714/E11.178 |
| 2023/0379236 | A1* | 11/2023 | Chen | H04L 43/06 |

FOREIGN PATENT DOCUMENTS

| | | | | |
|---|---|---|---|---|
| CN | 105024873 | A | * 11/2015 | |
| CN | 110535729 | A | * 12/2019 | H04L 43/18 |

(Continued)

OTHER PUBLICATIONS

Shen, "Fuzzy Test Case Generation Method Based on CoGAN industrial network protocol", 2020 (Year: 2020).*

(Continued)

*Primary Examiner* — Messeret F Gebre
(74) *Attorney, Agent, or Firm* — Ryan, Mason & Lewis, LLP (57) ABSTRACT

An apparatus comprises a processing device configured to receive a request to perform validation of a compatibility of a gateway device, the request specifying one of a plurality of different communication protocols for use in communicating with the gateway device as part of the validation. The processing device is also configured to select, from a database, a dataset for use in validating the compatibility of the gateway device, to convert the selected dataset to the specified communication protocol, and to operate the gateway device utilizing the selected dataset converted to the specified communication protocol. The processing device is further configured to validate the compatibility of the gateway device based at least in part on monitoring operation of the gateway device utilizing the selected dataset converted to the specified communication protocol.

20 Claims, 5 Drawing Sheets

(56) References Cited

FOREIGN PATENT DOCUMENTS

| | | | | |
|---|---|---|---|---|
| CN | 111813693 A | * | 10/2020 | .......... G06F 11/3684 |
| CN | 1122449013 A | * | 3/2021 | |
| CN | 112953793 A | * | 6/2021 | |
| CN | 113824612 A | * | 12/2021 | |
| WO | WO-2012026881 A1 | * | 3/2012 | ............ G06F 11/263 |

OTHER PUBLICATIONS

S. Hodek and J. Schlick, "Ad hoc field device integration using device profiles, concepts for automated configuration and web service technologies: Plug&Play field device integration concepts for industrial production processes,", 2012, pp. 1-6 (Year: 2012).*

Kumar, A., & Arora, A. (2020). An ANFIS-based compatibility scorecard for IoT integration in websites. Journal of Supercomputing, 76(4), 2568-96. (Year: 2020).*

C. Resende et al., "WGW4IIoT: Wireless Gateway for Industrial IoT," 2018 IEEE Symposium on Computers and Communications (ISCC), Natal, Brazil, 2018, pp. 01108-01113 (Year: 2018).*

Siemens, "Xcelerator Academy," https://training.plm.automation.siemens.com/index.cfm, Accessed Oct. 13, 2022, 2 pages.

Siemens, "Plant Simulation & Throughput Optimization," https://www.plm.automation.siemens.com/global/en/products/manufacturing-planning/plant-simulation-throughput-optimization.html, Accessed Oct. 13, 2022, 5 pages.

Siemens, "Xcelerator Academy," siemens.com/XceleratorAcademy, Sep. 2022, 2 pages.

Mathworks, "Certified MatLab Associate: Candidate Informaion," 90611_80840v00_AssociateCandidateInfo.pdf, Nov. 2016, 3 pages.

Mathworks, "Advance Your Skills with MatLab and Simulink Training," https://www.mathworks.com/learn/training.html, Accessed Jan. 13, 2023, 5 pages.

Mathworks, "Simulink is for Model-Based Design," https://www.mathworks.com/products/simulink.html, Accessed Jan. 13, 2023, 7 pages.

Aveva, "Aveva Dynamic Simulation," https://www.aveva.com/en/products/dynamic-simulation/, Accessed Jan. 13, 2023, 10 pages.

Aveva, "Aveva Training Services," https://www.aveva.com/en/training/, Accessed Jan. 13, 2023, 10 pages.

Aveva, "Aveva Dynamic Simulation," Datasheet_AVEVA_DynamicSimulation_12-20.pdf, Dec. 2020, 7 pages.

Aveva, "Dynsim Dynamic Simulation," https://www.aveva.com/content/dam/aveva/documents/datasheets/Datasheet_SE-LIO-DYNSIMDynamicSimulation_11-17.pdf, Feb. 2020, 7 pages.

Schneider Electric, "2022 Educational Services Training Schedule," https://www.se.com/US/en/download/document/2022_Training_Schedule/, Mar. 21, 2022, 2 pages.

J. Sonnenberg, "Raveon Technologies Corp. Technical Brief AN236," Serial Communications RS232, RS485, RS422, Oct. 2018, 6 pages.

"An Introduction to the ControlNet Network," http://www.dia.uniroma3.it/autom/Reti_e_Sistemi_Automazione/PDF/ControlNetDetails.pdf, 1999, 44 pages.

BACnet International, "Introduction to BACnet for Building Owners and Engineers," https://www.datasheetarchive.com/whats_new/87259464d4802e173459efdbc9fae42a.html, Mar. 2024, 22 pages.

Siemens, "CANopen Tutorial," Version 2.0, https://support.industry.siemens.com/cs/ww/en/view/109479771, Jul. 2019, 38 pages.

Tridonic, "DALI—Comparison between DALI & DALI-2," WhitePaer Controls, Jul. 2018, 10 pages.

Dell Technologies, "Intel Processor-Based Intelligent Edge Gateways," EGW-3200 / EGW-5200 Spec Sheet, H19242, Jul. 2022, 2 pages.

Dell Technologies, "Dell EMC Edge Gateway Essentials: Everything You Want to Know but Were Afraid to Ask," White Paper, H19040, Jan. 2022, 29 pages.

T. Day, "DNP3, Distributed Network Protocol v3, An Introduction," https://na.eventscloud.com/file_uploads/b68188f3ce5b22895a67b1afe5e51b6a_DNP3IntroductionHORS.PDF, Mar. 2018, 64 pages.

G. Thomas, "Introduction to Modbus Serial and Modbus TCP," The Extension, vol. 9, No. 5, Sep.-Oct. 2008, 4 pages.

M. Adamiak et al., "IEC 61850 Communication Networks and Systems In Substations: An Overview for Users," The Grid Modernization Journal, Spring 2009, pp. 61-68.

A. W. Colombo et al., "Service-oriented SCADA and MES Supporting Petri nets based Orchestrated Automation Systems," 38th Annual Conference on IEEE Industrial Electronics Society, Oct. 2012, pp. 6148-6154.

R. Mackiewicz, "Technical Overview and Benefits of the IEC 61850 Standard for Substation Automation," IEEE PES Power Systems Conference and Exposition, Nov. 2006, 8 pages.

Litmus, "Edge Platform," https://litmus.io/wp-content/uploads/2020/02/Litmus-Edge-Platform.pdf, Feb. 2020, 4 pages.

T. Lojka et al., "Service-oriented Architecture and Cloud Manufacturing," Acta Polytechnica Hungarica, vol. 13, No. 6, Jan. 2016, pp. 25-44.

Message Passing Interface Forum, "MPI: A Message-Passing Interface Standard," Version 3.0, Sep. 21, 2012, 852 pages.

Oasis, "Oasis Standard," MQTT Version 3.1.1, Standards Track Work Product, Oct. 29, 2014, 81 pages.

Modicon, Inc., "Modicon Modbus Protocol Reference Guide," PI-MBUS-300 Rev. J, Jun. 1996, 121 pages.

OPC Foundation, "OPC Unified Architecture: Interoperability for Industrie 4.0 and the Internet of Things," Version V13, Oct. 2022, 56 pages.

Profibus & Profinet International (PI), "Profibus System Description—Technology and Application," Order No. 4332, Apr. 2016, 36 pages.

Profibus & Profinet International (PI), "Profinet System Description—Technology and Application," Order No. 4.132, Oct. 2014, 28 pages.

Siemens, "Simatic S7-1500/ET 200MP Automation System In a Nutshell," Oct. 2016, 48 pages.

Ericsson AB, "Simple Network Management Protocol (SNMP)," Dec. 14, 2022, 222 pages.

WEG, "DeviceNet Communication Manual," Series: SSW-07/SSW-08, Document: 10000046963/00, Mar. 2008, 22 pages.

P. Matousek, "Description and Analysis of IEC 104 Protocol," Technical Report No. FIT-TR-2017-12, Dec. 2017, 38 pages.

Dell Technologies, "What is an Industrial Gateway?" https://infohub.delltechnologies.com/l/dell-technologies-validated-design-for-manufacturing-edge-with-litmus-design-guide/what-is-an-industrial-gatewa%E2%80%A6, Accessed Jan. 9, 2023, 2 pages.

* cited by examiner

VALIDATION OF COMPATIBILITY OF INDUSTRIAL GATEWAY DEVICES

FIELD

The field relates generally to information processing, and more particularly to management in information processing systems.

BACKGROUND

Various industrial sites run software and processes developed by independent software vendors (ISVs). To test such software and processes, random data is commonly used in lab environments. Such random data may be limited to generating different wave functions, such as sine, square, triangle, sawtooth, etc. which does not accurately mimic real-world operation. Industrial automation simulators may be used to generated random data for such testing. Industrial automation simulators, however, typically require a specific hardware and software platform, use a shared database, and require a high level of expertise to build and run. Key performance indicators (KPIs) also typically cannot be used with industrial automation simulators, as no real data is used (e.g., only randomly-generated data).

SUMMARY

Illustrative embodiments of the present disclosure provide techniques for validating compatibility of gateway devices, including gateway devices deployed at industrial sites.

In one embodiment, an apparatus comprises at least one processing device comprising a processor coupled to a memory. The at least one processing device is configured to receive a request to perform validation of a compatibility of a gateway device, the request specifying one of a plurality of different communication protocols for use in communicating with the gateway device as part of the validation of the compatibility of the gateway device. The at least one processing device is also configured to select, from a database, a dataset for use in validating the compatibility of the gateway device, to convert the selected dataset to the specified communication protocol, and to operate the gateway device utilizing the selected dataset converted to the specified communication protocol. The at least one processing device is further configured to validate the compatibility of the gateway device based at least in part on monitoring operation of the gateway device utilizing the selected dataset converted to the specified communication protocol.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Industrial automation software may be used to model, simulate, explore and optimize logistics systems and their associated processes at different industrial sites. In some cases, industrial automation software provides discrete event simulation and statistical analysis to optimize material handling, logistics, machine utilization and labor requirements. Industrial automation software may be used, for example, to automatically detect bottlenecks, to analyze throughput, and to determine utilization of machines, resources and buffers at industrial sites. Some industrial automation software is further configured with an integrated energy analyzer for showing current, maximum and total energy consumption. Industrial automation software may allow for creation of a virtual model (e.g., a "digital twin") that is linked to a real-world industrial site to simulate actual production, and to test and control optimization, automation and material transport at the industrial site. Results of such analysis may be used for debugging programming of programmable logic controllers (PLCs) in a virtual environment prior to installation and running the PLCs in a production environment. Industrial automation software may require extensive training where engineers learn how to prepare, execute and evaluate simulation studies to test solutions for any problems. Such training may involve one or multiple "courses" for training users. The industrial automation software may also require costly software licenses.

In some cases, industrial automation software provides a graphical programming environment for modeling, simulating and analyzing dynamic systems for use in automatic control and digital signal processing for multi-domain simulation and model-based design. Industrial automation software may be designed as a generic tool for use in a wide range of areas, allowing for designing and simulating systems before moving to hardware, with capabilities including: a graphical editor for modeling all components of a system; a library of prebuilt blocks for modeling algorithms and physical systems; large-scale modeling blocks for creating reusable system components and libraries; a simulation engine with Ordinary Differential Equations (ODE) solvers for verifying that all parts of a system work together; and visualization tools for analyzing and comparing results from multiple simulations.

Industrial automation software may also or alternatively provide a dynamic process simulator that enables tasks of designing, commissioning, controlling and operating a process for use at an industrial site. The industrial automation software can assist in process design, controls checkout and control system design, and may include modules for operator training simulation.

When evaluating industrial automation software, it is important to consider various features, including but not limited to the amount and cost of training required, communication protocols, acquisition cost, and availability of industrial samples. Different industrial automation software takes different approaches for training, such as a direct and complete course to understand all aspects of a particular industrial automation software. This approach, however, generally leads to superficial coverage of many subjects, and it is not expected that a user will gain a deep understanding of the application with only one course. Another approach is to provide different training courses for customized modules (e.g., for different industrial applications, such as vehicles, wind turbines, industrial processes, etc.). While this approach provides increased flexibility, deeper training is required which is more time-consuming and costly.

An important feature of industrial automation software is communication, and support for different industrial communication protocols. If industrial automation software is to be used to generate data for running as a testbed, it should support communication with any industrial protocol. Conventional industrial automation software may have the capability of exchanging data using third-party software or a database (e.g., a structured query language (SQL) database), but often lacks support for various industrial communication protocols (e.g., such as supporting only a single type of industrial communication protocol). Such restrictions make conventional industrial automation software impossible or impractical to use as a testbed.

The availability of industrial samples is also an important factor to consider. Some conventional industrial automation software uses Laboratory Virtual Instrument Engineering Workbench (LabVIEW by National Instruments) for simulating industrial data to test solutions. Such an approach, however, does not provide complex industrial samples that accurately simulate real-world industrial data. Use of such simulated industrial data also requires building equations and equipment interlocks for a particular system.

Illustrative embodiments provide technical solutions which overcome these and other technical problems with conventional industrial automation software. The technical solutions described herein provide a novel approach for an industrial testbed that is reliable and feasible. Advantageously, the technical solutions described herein provide an architecture which can run on a low-cost physical machine or on virtualized computing resources. The architecture utilizes an SQL or other type of database with real-world industrial datasets and supports multiple industrial communication protocols. The real-world industrial datasets include both "steady regime" (e.g., normal operation) and "attack" (e.g., abnormal operation) data. Multiple industrial communication protocols are supported, and key performance indicators (KPIs) are made available to end-users. The technical solutions do not require extensive user training (e.g., the technical solution is "plug and play") and can run on various different platforms, including different hardware and software, such as multiple different operating systems (OSes).

Figure 1:
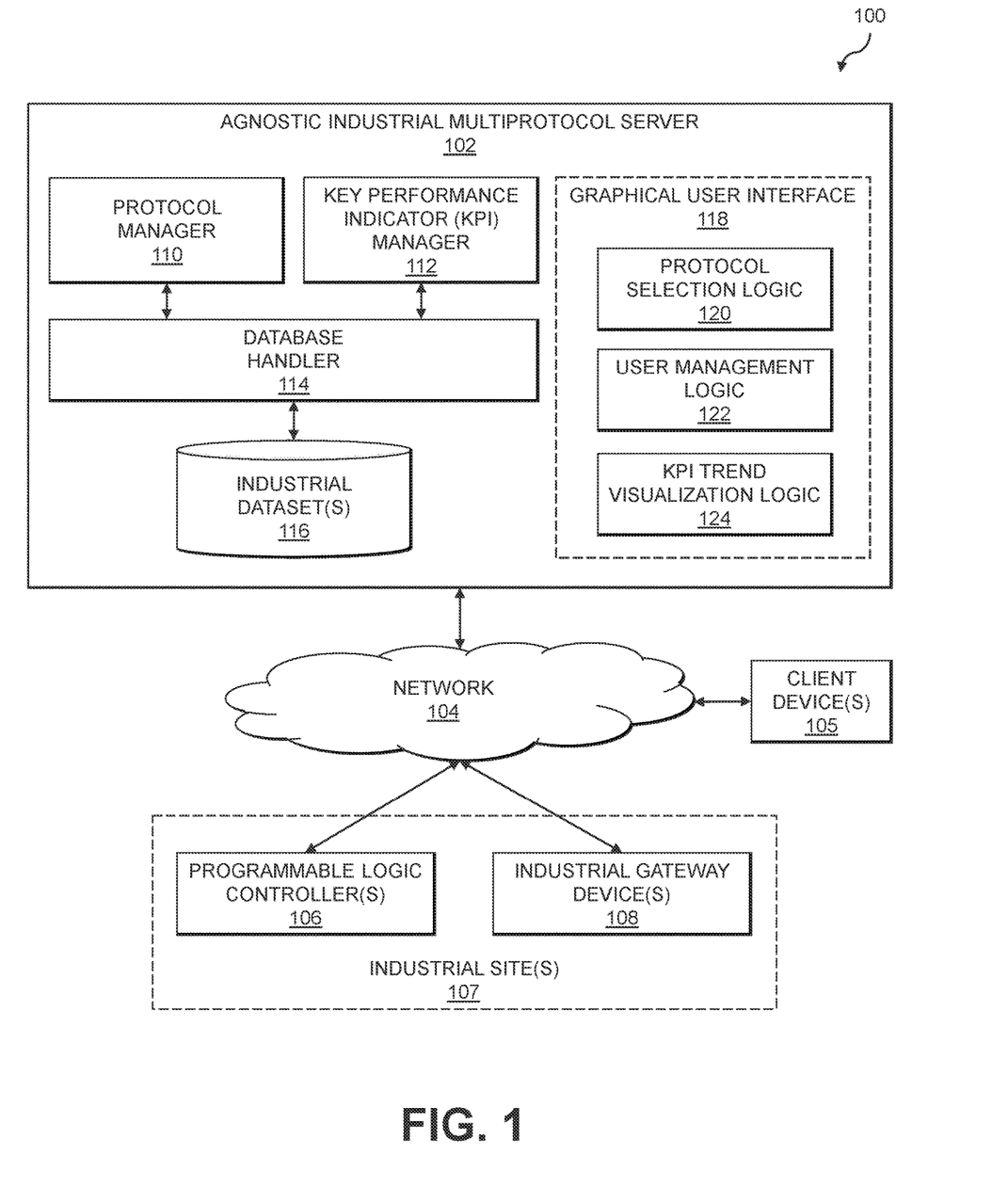
FIG. 1 is a block diagram of an information processing system configured for validating compatibility of gateway devices deployed at industrial sites in an illustrative embodiment.

FIG. 1 shows an information processing system 100 configured in accordance with an illustrative embodiment. The information processing system 100 is assumed to be built on at least one processing platform and provides functionality for validating compatibility of gateway devices, including "industrial" gateway devices that are or will be deployed at one or more industrial sites. An industrial gateway device comprises a gateway device that is configured to receive data from various industrial equipment using various industrial communication protocols. The industrial gateway device may forward such data to another location (e.g., an edge data center, a cloud computing site, etc.) for analysis (e.g., such as identifying trend information). The industrial gateway device may also or alternatively process data locally for performing various functions (e.g., data ingestion, data normalization, data analytics, data filtering, data forwarding, etc.) to reduce an amount of data to be sent through the network. The information processing system 100 includes an agnostic industrial multiprotocol server 102 which is coupled, via network 104, to one or more client devices 105, one or more programmable logic controllers (PLCs) 106 and one or more industrial gateway devices (IGDs) 108. As will be described in further detail below, the PLCs 106 and IGDs 108 may be deployed at one or more industrial sites 107.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The client devices 105 may comprise, for example, physical computing devices such as Internet of Things (IOT) devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 105 may also or alternately comprise virtualized computing resources, such as virtual machines (VMs), containers, etc.

The client devices 105 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art. In some embodiments, the client devices 105 comprise assets of an IT infrastructure operated by an enterprise.

The PLCs 106 and IGDs 108 may include various types of devices. Some non-limiting examples of PLC devices which may be used as the PLCs 106 include Siemens® SIMATIC S7-1500 PLC, Allen-Bradley® PLC and programmable automation controller (PAC) control systems, etc. Some non-limiting examples of gateway devices which may be used as the IGDs 108 include various intelligent edge gateways including Dell® Edge Gateway 5200 (EGW-5200), Dell® Edge Gateway 3200 (EGW-3200), etc. The IGDs 108 may comprise servers or other devices which are configured to receive data from various industrial equipment using various industrial communication protocols. The IGDs 108 may be configured to forward such data to another location (e.g., an edge data center, a cloud computing site, etc.) for analysis (e.g., such as identifying trend information). The IGDs 108 may also be configured to process data locally for performing various functions (e.g., data ingestion, data normalization, data analytics, data filtering, data forwarding, etc.) to reduce an amount of data to be sent through the network. Such local processing can also help with faster decision making at an industrial site. The IGDs 108 may differ from a standard server or processing device, in that the hardware of the IGDs 108 may be designed to withstand potentially harsh environmental conditions which are present at industrial sites. In some cases, IGDs 108 may be configured with hardware having relatively low computing resources to reduce costs and/or power consumption. The IGDs 108 may function utilizing specialized software that can interface with various industrial communication protocols as described elsewhere herein. The IGDs 108 may run various software provided by ISVs (e.g., vendors different than the vendor which manufactures the IGDs 108 themselves).

The PLCs 106 and IGDs 108, as noted above, may be deployed at one or more industrial sites 107. The agnostic industrial multiprotocol server 102 may communicate, over network 104, with the PLCs 106 utilizing digital and/or analog inputs and outputs. The agnostic industrial multiprotocol server 102 may communicate, over network 104, with the IGDs 108 utilizing various industrial communication protocols. Some non-limiting examples of industrial communication protocols which may be used for communication between the agnostic industrial multiprotocol server 102 and the IGDs 108 include International Electrotechnical Commission (IEC) 61850, IEC 608740-5-104 (IEC 104), Controller Area Network (CAN), CANopen, Modbus (e.g., Modbus RTU, Modbus TCP, etc.), Profinet, Profibus, DALI, Message Queuing Telemetry Transport (MQTT), Distributed Network Protocol (DNP) 3, Building Automation Control Network (BACnet), OPC Unified Architecture (OPC UA), Message-Passing Interface (MPI), DeviceNet, ControlNet, Simple Network Management Protocol (SNMP), etc.

Figure 2:
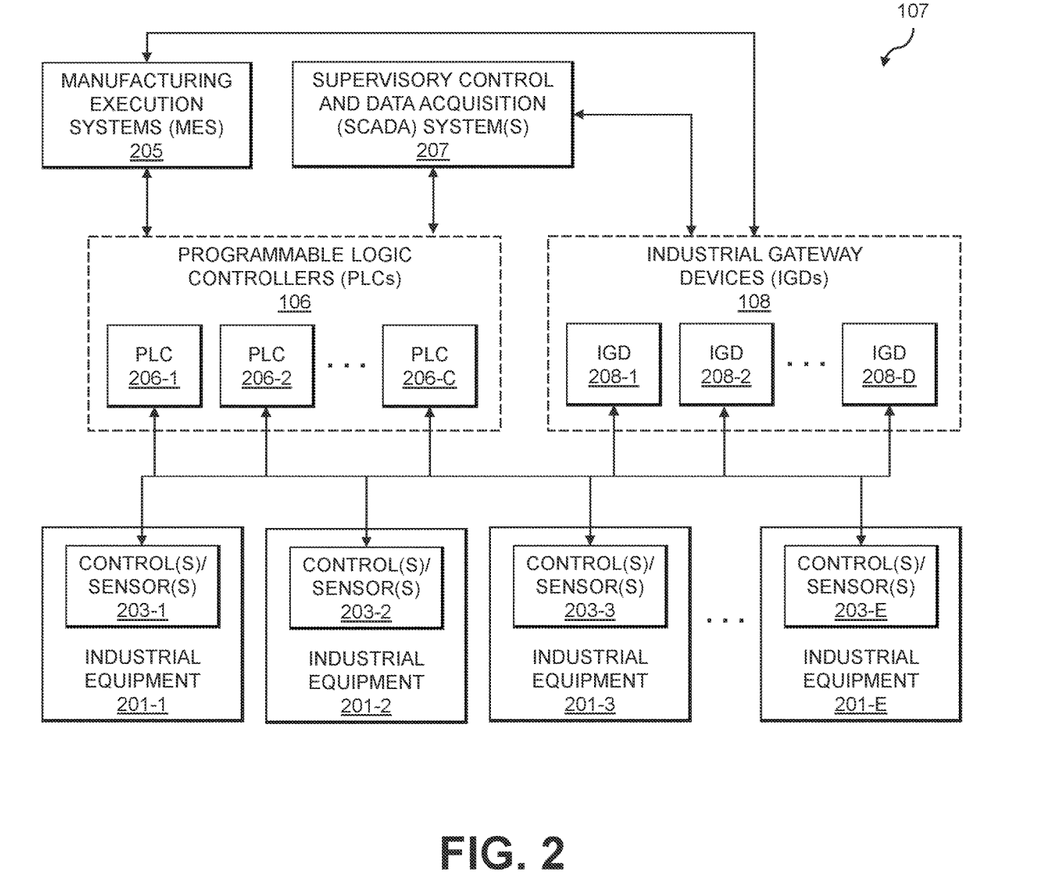
FIG. 2 is a block diagram of an industrial site including programmable logic controllers and industrial gateway devices connected to controls and sensors of different industrial equipment in an illustrative embodiment.

FIG. 2 shows an example of the PLCs 106 and IGDs 108 deployed at an industrial site 107 including a set of industrial equipment 201-1, 201-2, 201-3, . . . 201-E (collectively, industrial equipment 201) implementing respective sets of one or more controls and/or sensors 203-1, 203-2, 203-3, . . . 203-E (collectively, controls/sensors 203). The industrial equipment 201 and associated controls/sensors 203 will vary based on the type of the industrial site 107, such as power generation plants and facilities, water treatment plants and facilities, petroleum and other gas refinery facilities, manufacturing facilities including but not limited to automotive, aerospace, etc. The controls/sensors 203 will similarly vary based on the type of industrial site 107 and the industrial equipment 201 used at the industrial site 107. Consider, for example, an industrial water treatment site, which may include pre-treatment and final treatment stages. The industrial equipment 201 at an industrial water treatment site may include, for example, tanks, pumps, filters, mixers, drains, flow valves, etc. The controls/sensors 203 may include controls for such industrial equipment 201, as well as sensors such as flow sensors, pressure sensors, pH sensors, oxidation-reduction potential (ORP) sensors, conductivity sensors, volume sensors, etc. Consider, as another example, a heat and power generation site, which includes industrial equipment 201 such as tanks, pumps, filters, mixers, turbines, etc. and controls/sensors 203 including controls for such industrial equipment 201 as well as various types of sensors including temperature sensors, flow sensors, differential pressure sensors, power sensors, rotation sensors, torque sensors, humidity sensors, chemical sensors, etc.

The PLCs 106 are assumed to include a set of PLCs 206-1, 206-2, . . . 206-C (collectively, PLCs 206) which control different subsets of the industrial equipment 201. Similarly, the IGDs 108 are assumed to include a set of IGDs 208-1, 208-2, . . . 208-D) which manage different subsets of the industrial equipment 201. The PLC 206-1, for example, may control the industrial equipment 201-1 and 201-2 via the controls/sensors 203-1 and 203-2, while PLC 206-2 controls the industrial equipment 201-2 and 201-3 via the controls/sensors 203-2 and 203-3, and PLC 206-C controls industrial equipment 201-E via the controls/sensors 203-E. In this example, some of the industrial equipment 201 is controlled via a single one of the PLCs 206 (e.g., industrial equipment 201-1 controlled by PLC 206-1, industrial equipment 201-3 controlled by PLC 206-2, industrial equipment 201-E controlled by PLC 206-C), while other industrial equipment 201 is controlled via multiple ones of the PLCs 206 (e.g., industrial equipment 201-2 controlled by PLC 206-1 and 206-2). Similarly, different ones of the IGDs 208 may manage different ones of the industrial equipment 201 via different ones of the controls/sensors 203 as illustrated in FIG. 2. It should be noted, however, that various other combinations are possible. For example, a single PLC and/or IGD may control or manage all of the industrial equipment at a particular industrial site, each piece of industrial equipment may be controlled or managed by a separate PLC or IGD, there may be multiple PLCs and IGDs but each piece of industrial equipment is controlled and managed by only a single one of the multiple PLCs and IGDs (or by one PLC and one IGD, by one PLC but multiple IGDs, by one IGD but multiple PLCs), etc. The IGDs 208 may also be coupled to the PLCs 206.

The industrial equipment 201 may be operated, controlled and managed via the PLCs 206 and/or IGDs 208, via logic that is implemented via Manufacturing Execution Systems (MES) 205 and/or Supervisory Control and Data Acquisition (SCADA) systems 207. For example, the PLC 206-1 may obtain information regarding a running state of the industrial equipment 201-1 via one or more sensors in the controls/sensors 203-1. This information may be reported to the MES 205 and/or SCADA systems 207, which provide instructions for setting controls in the controls/sensors 203-1 to the PLC 206-1. The PLC 206-1 will then actuate controls in the controls/sensors 203-1 in accordance with the received instructions. Although FIG. 2 shows an example where the MES 205 and SCADA systems 207 are implemented external to the PLCs 206 and IGDs 208, in some embodiments the MES 205 and/or SCADA systems 207 may be implemented within one or more of the PLCs 206 and/or IGDs 208. Further, in some cases the MES 205 and/or SCADA systems 207 may be implemented external to the industrial site 107 (e.g., such as at one or more of the client devices 105 described above in conjunction with FIG. 1, on cloud computing platforms coupled to the industrial site 107 over one or more networks, etc.).

The agnostic industrial multiprotocol server 102 may run at an "edge" computing site, enabling an edge solution team to test features close to "real" customer environments (e.g., the industrial sites 107). The agnostic industrial multiprotocol server 102 can further provide a portable and configurable solution running different ones of the industrial datasets 116, allowing end-users to build a solution and test all features at an organization's premises (e.g., the industrial sites 107 via the PLCs 106 and the IGDs 108). End-users can use the agnostic industrial multiprotocol server 102 to see their organization's configuration (e.g., one of the industrial sites 107) mirrored within the solution from a safe, controlled environment. End-users can utilize the agnostic industrial multiprotocol server 102 to test new configurations at the industrial sites 107, through simulation with the real-world industrial datasets 116. An industrial customer may require weeks or months to configure large-scale environments (e.g., at the industrial sites 107). Using the agnostic industrial multiprotocol server 102, industrial customers can fully test new equipment (e.g., possibly including the PLCs 106 and/or IGDs 108 at the industrial sites 107) before integrating them into a production environment. In addition, the agnostic industrial multiprotocol server 102 can be used to simulate different "disturbances" in processes (e.g., attacks). Based at least in part on the results of simulations, industrial customers may decide to acquire new hardware and/or software to improve processes, thereby streamlining the process of qualifying a vendor's products for use at the industrial sites 107.

At edge solutions, real industrial data ingestion is needed to validate any Independent Software Vendor (ISV). All ISV solutions should be tested over different industrial protocols, such as Modbus, Profinet, OPC, MQTT, CANopen, etc. ISV validation should further be based on steady regime operation as well as process instabilities (e.g., attacks or other disruptions). Process edge validation may be performed by information technology (IT) experts having little experience with industrial processes (e.g., such as the petrochemical industry, including petrochemical plants, oil and gas exploration, refineries, power generation, manufacturing, etc.). Validation edge processes should run in different hardware and software (e.g., different operating systems (OSes)), similar to real-world end customer environments like the industrial sites 107. The agnostic industrial multiprotocol server 102 provides technical solutions which address these and other technical problems, enabling various ISV and process validation based on real-world industrial datasets 116 that reside within an integrated database or data store. The agnostic industrial multiprotocol server 102 can advantageously work as a server over any desired type of industrial protocol used for communicating with PLCs 106 and/or IGDs 108 at the industrial sites 107.

The database handler 114 of the agnostic industrial multiprotocol server 102 is used to query and update the database or data store hosting the industrial datasets 116. In some embodiments, the industrial datasets 116 are stored in a Structured Query Language (SQL) database, but this is not a requirement. Various other types of databases and data stores may be used. The protocol manager 110 is configured to manage different industrial protocols, and make them available to validation ISV clients (e.g., the PLCs 106 and/or the IGDs 108). The protocol manager 110 is further responsible for exchanging data with the validation ISV or other external industrial clients (e.g., the PLCs 106 and/or the IGDs 108). The KPI manager 112 is configured to make available various KPIs which may be used for evaluating or validating ISV clients and processes through simulation utilizing the industrial datasets 116. The agnostic industrial multiprotocol server 102 advantageously is configured to utilize real, rather than simulated, industrial data (e.g., the industrial datasets 116) for testing new configurations. The agnostic industrial multiprotocol server 102 is also advantageously configured to use "attacks" to validate process instabilities. Such "attacks" may be pre-configured tables in a database or data store (e.g., in which the industrial datasets 116 are stored) which store discrepant process values. If requested, the database handler 114 can dynamically switch from "steady state" (e.g., normal operation) tables or data for a particular one of the industrial datasets 116 and "attack" tables or data for that industrial dataset 116 in order to simulate attacks during process validation. The agnostic industrial multiprotocol server 102 is also advantageously easy-to-use, and does not require an end-user (e.g., of client devices 105) to have industrial process knowledge. This is facilitated through the use of KPIs made available to end-users via the KPI manager 112. The agnostic industrial multiprotocol server 102 may use configurable ethernet ports and industrial standards, including but not limited to RS-422, RS-485, RS-232, Profi bus, etc. The agnostic industrial multiprotocol server 102 can further be implemented at least in part utilizing virtualized computing resources (e.g., one or more software containers and/or virtual machines VMs) and/or physical computing resources (e.g., on bare metal devices) utilizing various OSes.

The agnostic industrial multiprotocol server 102 may be used in a wide variety of use case scenarios. Such use case scenarios include, for example, a vendor of a given one of the IGDs 108 that is seeking to validate use of a hardware and/or software configuration of the given IGD 108 with various software (e.g., provided by ISVs other than a vendor which manufactures or produces the given IGD 108). In such cases, the vendor of the given IGD 108 seeks to test ISV software or functionality to determine whether it works as expected or desired on the hardware and/or software configuration of the given IGD 108. The given IGD 108, for example, may run industrial IoT (IIoT) management software such as the Litmus Edge Platform providing an Industrial Edge Computing Platform and IIoT device and data management layer. For this use case scenario, different ones of the industrial datasets 116 may be utilized as desired (e.g., to confirm that the hardware and software configuration of the given IGD 108 will work with multiple types of industrial systems from which the industrial datasets 116 are collected). Generally, the goal in this use case scenario is to determine whether the hardware and/or software configuration of the given IGD 108 will be compatible with different ISV software, regardless of which type of industrial site 107 the given IGD 108 is deployed at.

Another use case scenario includes testing or validating the given IGD 108 for an actual, real-world configuration of a given one of the industrial sites 107. The agnostic industrial multiprotocol server 102 may gather data from the given industrial site 107 (e.g., from one or more of the PLCs 106 deployed at the given industrial site 107), and store that data as a given one of the industrial datasets 116. The agnostic industrial multiprotocol server 102 may then validate deployment of the given IGD 108 at the given industrial site 107 using the given industrial dataset 116. The deployment of the given IGD 108 at the given industrial site 107 may be validated using any desired industrial protocol, which may be selected via the protocol manager 110.

Still another use case scenario includes testing or validating the given IGD 108 for a proposed configuration of the given industrial site 107. An end-user, for example, may want to simulate one or more processes at the given industrial site 107 (e.g., using the given industrial dataset 116 previously collected from the given industrial site 107, possibly including transitioning between steady state or normal operating data and attack data for the given industrial dataset 116). This may be used to test or validate a change in configuration of the given industrial site 107 (e.g., a change in industrial equipment at the given industrial site 107, a change in control processes, combinations thereof, etc.). This may also or alternatively be used for training operators of the given industrial site 107.

The agnostic industrial multiprotocol server 102 in the FIG. 1 embodiment is assumed to be implemented using at least one processing device. Each such processing device generally comprises at least one processor and an associated memory, and implements one or more functional modules or logic for controlling certain features of the agnostic industrial multiprotocol server 102. In the FIG. 1 embodiment, the agnostic industrial multiprotocol server 102 includes a protocol manager 110, a key performance indicator (KPI) manager 112, and a database handler 114. The database handler 114 is configured to interface with a database or other data store in which one or more real-world industrial datasets 116 are stored.

The industrial datasets 116 may be collected from the industrial sites 107 via the PLCs 106 deployed at the industrial sites 107. The industrial datasets 116 may be stored in a protocol-agnostic manner. Different ones of the PLCs 106 may communicate data of the industrial datasets 116 to the agnostic industrial multiprotocol server 102 using a particular industrial protocol, and then may be converted into a protocol-agnostic format for storage as one of the industrial datasets 116. When ones of the industrial datasets 116 are to be utilized for validation or testing (e.g., of whether the hardware or software configuration of a given one of the IGDs 108 is compatible with ISV software, of whether the hardware and/or software configuration of the given IGD 108 is compatible with an actual real-world configuration of a given one of the industrial sites 107 or a portion thereof, of whether the hardware and/or software configuration of the given IGD 108 is compatible with a proposed configuration of the given industrial site 107 or a portion thereof, etc.).

The database or data store where the industrial datasets 116 are stored may be implemented using one or more storage systems, which may be part of or external to the agnostic industrial multiprotocol server 102. A given storage system as the term is broadly used herein can comprise, for example, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, scale-out NAS clusters, content addressable storage systems, or flash-based storage systems. Combinations of multiple ones of these and other storage products can also be used in implementing a given storage system in an illustrative embodiment.

The agnostic industrial multiprotocol server 102 is further configured to implement a graphical user interface (GUI) 118, which may be provided or made accessible to users (e.g., of the client devices 105) for controlling various aspects of the agnostic industrial multiprotocol server 102. For example, the GUI 118 implements protocol selection logic 120 enabling a user to select a particular protocol to use for testing or validation of a compatibility of the hardware and/or software configuration of a given IGD 108 with one or more independent software vendor (ISV) solutions and processes, for testing or validation of a compatibility of the given IGD 108 with an actual real-world configuration of a particular industrial site 107, for testing or validation of a compatibility of the given IGD 108 with a proposed configuration of a particular industrial site 107, etc. The protocol may be selected from among a set of available or compatible protocols for a particular one of the industrial sites 107, as determined utilizing the protocol manager 110.

The GUI 118 also implements user management logic 122, which may perform user authorization before permitting users to access various features of the agnostic industrial multiprotocol server 102 (e.g., such as determining that a user has sufficient authorization to perform testing or validation of ISV solutions and processes at a particular one of the industrial sites 107). The GUI 118 further implements KPI trend visualization logic 124, enabling a user to view available KPIs (e.g., as determined using the KPI manager 112) and generate visualizations of such KPIs to analyze the results of validation tests and processes which are run at the industrial sites 107 utilizing one or more of the real-world industrial datasets 116.

It is to be appreciated that the particular arrangement of the agnostic industrial multiprotocol server 102, the network 104, the client devices 105, the PLCs 106 and the IGDs 108 illustrated in the FIG. 1 embodiment is presented by way of example only, and alternative arrangements can be used in other embodiments. For example, different ones of the industrial sites 107 may utilize different numbers and combinations of PLCs 106 and/or IGDs 108. As another example, one or more of the client devices 105 may be implemented internal to one or more of the industrial sites 107. As a further example, functionality associated with the protocol manager 110, KPI manager 112, database handler 114, GUI 118 (e.g., including the protocol selection logic 120, user management logic 122 and KPI trend visualization logic 124) may be combined into fewer modules or logic, or may be separated across more modules or logic, with the multiple modules or logic possibly being implemented with multiple distinct processors or processing devices.

At least portions of the agnostic industrial multiprotocol server 102, such as the protocol manager 110, KPI manager 112, database handler 114, GUI 118 (e.g., including the protocol selection logic 120, user management logic 122 and KPI trend visualization logic 124) may be implemented at least in part in the form of software that is stored in memory and executed by a processor.

Although not explicitly shown in FIG. 1, one or more input-output devices such as keyboards, displays or other types of input-output devices may be used to support one or more user interfaces to the agnostic industrial multiprotocol server 102, as well as to support communication between the agnostic industrial multiprotocol server 102 and other related systems and devices not explicitly shown.

It is to be understood that the particular set of elements shown in FIG. 1 for validating compatibility of gateway devices is presented by way of illustrative example only, and in other embodiments additional or alternative elements may be used. Thus, another embodiment may include additional or alternative systems, devices and other network entities, as well as different arrangements of modules and other components.

The agnostic industrial multiprotocol server 102 and other portions of the system 100, as will be described in further detail below, may be part of cloud infrastructure.

The agnostic industrial multiprotocol server 102, the client devices 105, the PLCs 106, the IGDs 108 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The agnostic industrial multiprotocol server 102, the client devices 105, the PLCs 106, the IGDs 108, or components thereof, may be implemented on respective distinct processing platforms, although numerous other arrangements are possible. For example, in some embodiments at least portions of the agnostic industrial multiprotocol server 102 and one or more of the client devices 105 are implemented on the same processing platform. A given one of the client devices 105 can therefore be implemented at least in part within at least one processing platform that implements at least a portion of the agnostic industrial multiprotocol server 102, or within at least one processing platform that implements at least a portion of one or more of the PLCs 106 and/or one or more of the IGDs 108.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the agnostic industrial multiprotocol server 102, the client devices 105, the PLCs 106 and the IGDs 108, or portions or components thereof, to reside in different data centers. Numerous other distributed implementations are possible.

Additional examples of processing platforms utilized to implement the agnostic industrial multiprotocol server 102, the client devices 105, the PLCs 106, the IGDs 108 and other components of the system 100 in illustrative embodiments will be described in more detail below in conjunction with FIGS. 4 and 5.

It is to be appreciated that these and other features of illustrative embodiments are presented by way of example only, and should not be construed as limiting in any way.

Figure 3:
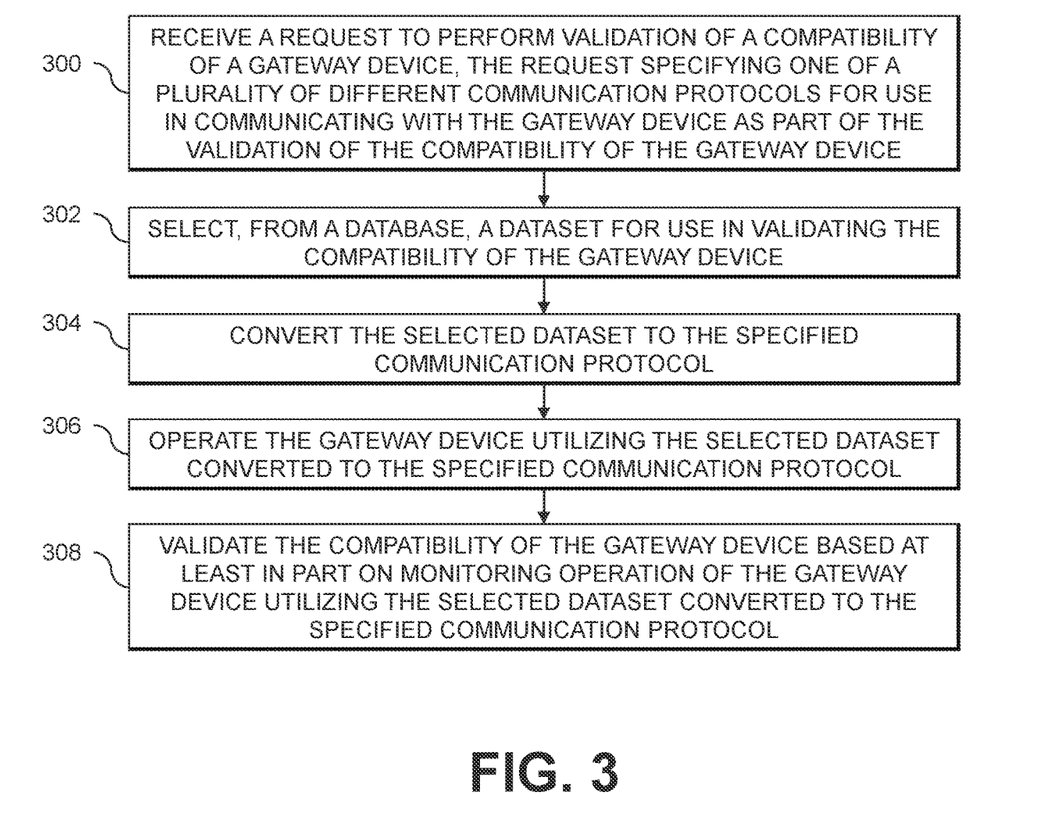
FIG. 3 is a flow diagram of an exemplary process for validating compatibility of gateway devices in an illustrative embodiment.

An exemplary process for validating compatibility of gateway devices will now be described in more detail with reference to the flow diagram of FIG. 3. It is to be understood that this particular process is only an example, and that additional or alternative processes for validating compatibility of gateway devices may be used in other embodiments.

In this embodiment, the process includes steps 300 through 308. These steps are assumed to be performed by the agnostic industrial multiprotocol server 102 utilizing the protocol manager 110, the KPI manager 112, the database handler 114, the industrial datasets 116 and the GUI 118. The process begins with step 300, receiving a request to perform validation of a compatibility of a gateway device (e.g., one of the IGDs 108). The request specifies one of a plurality of different communication protocols for use in communicating with the gateway device as part of the validation of the compatibility of the gateway device. In step 302, a dataset (e.g., one of the industrial datasets 116) is selected from a database for use in validating the compatibility of the gateway device. The database may comprise a plurality of industrial datasets collected via one or more PLCs (e.g., PLCs 106) during operation of industrial equipment at one or more industrial sites (e.g., industrial sites 107). In step 304, the selected dataset is converted to the communication protocol which was specified in the request received in step 300. The gateway device is operated in step 306 utilizing the selected dataset converted to the specified communication protocol. The compatibility of the gateway device is then validated in step 308 based at least in part on monitoring operation of the gateway device utilizing the selected dataset converted to the specified communication protocol. Monitoring the operation of the gateway device may comprise determining trend information for one or more selected KPIs, and outputting one or more visualizations characterizing the determined trend information for the one or more selected KPIs.

The selected dataset may comprise a first set of data characterizing normal operation of industrial equipment at one or more industrial sites and a second set of data characterizing one or more process instabilities for operation of the industrial equipment at the one or more industrial sites. Validating the compatibility of the gateway device in step 308 may comprise validating compatibility while operating the gateway device utilizing both the first set of data and the second set of data.

In some embodiments, the request received in step 300 comprises a request to validate compatibility of at least one of hardware and software of the gateway device with software of one or more independent software vendors. The gateway device may be manufactured by a given vendor, and the request received in step 300 may comprise a request to validate compatibility of hardware of the gateway device with software that runs on the gateway device, the software being provided by one or more ISVs other than the given vendor. The software of the one or more ISVs may comprise IIoT management software providing device and data management for one or more IIoT devices deployed at one or more industrial sites.

In other embodiments, the request received in step 300 comprises a request to validate a compatibility of the gateway device while operating the gateway device at a designated industrial site. The designated industrial site may comprise at least one of a power generation facility, a water treatment facility, a gas refinery facility, and a manufacturing facility. The selected dataset may have been previously collected from one or more PLCs deployed at the designated industrial site. The request received in step 300 may comprise a request to validate compatibility of the gateway device with a current configuration of industrial equipment deployed at a designated industrial site, with one or more proposed changes to a current configuration of industrial equipment deployed at the designated industrial site, or with one or more simulated processes for operating industrial equipment deployed at the designated industrial site.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for validating compatibility of IGDs will now be described in greater detail with reference to FIGS. 4 and 5. Although described in the context of system 100, these platforms may also be used to implement at least portions of other information processing systems in other embodiments.

Figure 4:
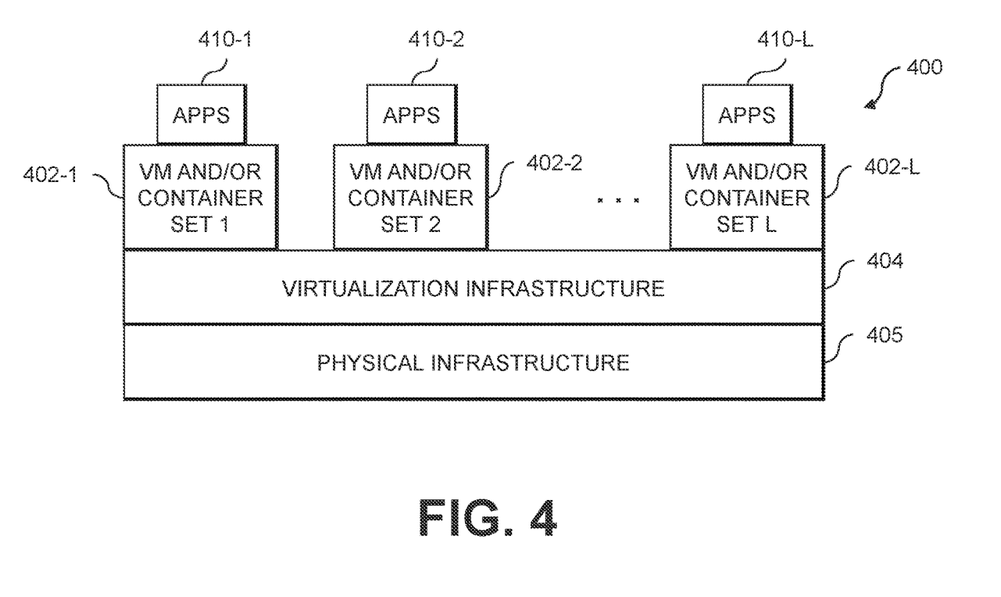
FIGS. 4 and 5 show examples of processing platforms that may be utilized to implement at least a portion of an information processing system in illustrative embodiments.
Figure 5:
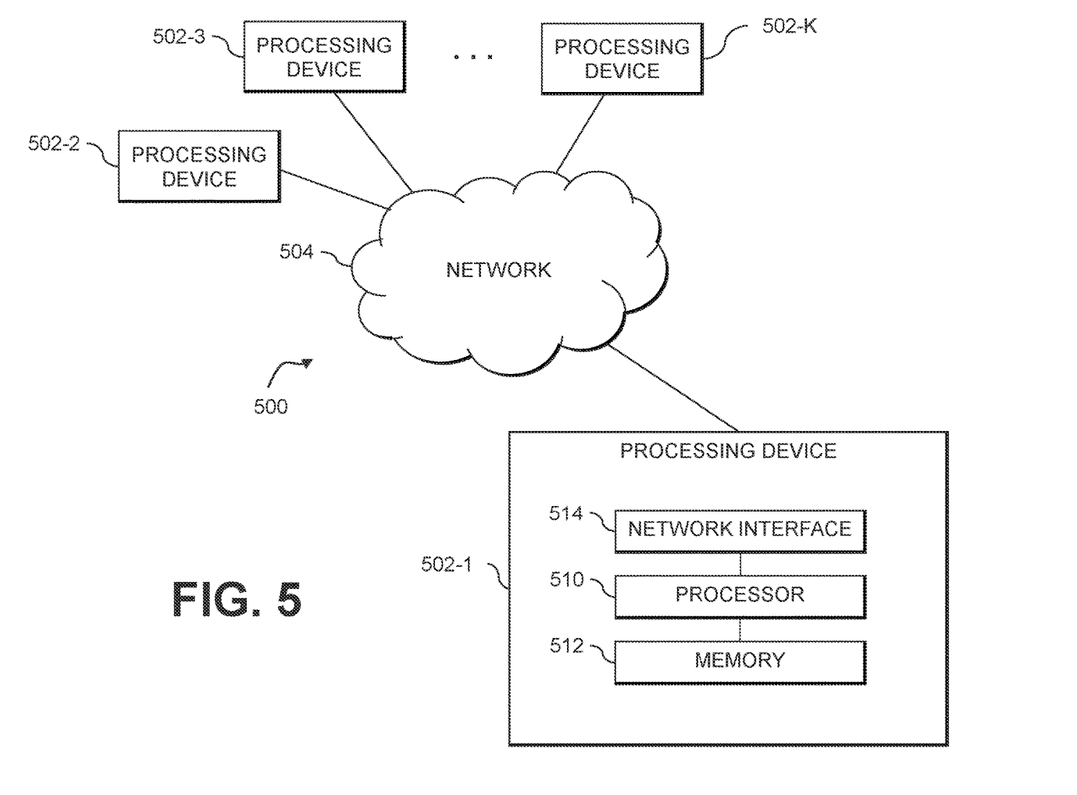

FIG. 4 shows an example processing platform comprising cloud infrastructure 400. The cloud infrastructure 400 comprises a combination of physical and virtual processing resources that may be utilized to implement at least a portion of the information processing system 100 in FIG. 1. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. A hypervisor platform may be used to implement a hypervisor within the virtualization infrastructure 404, where the hypervisor platform has an associated virtual infrastructure management system. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU), network processing unit (NPU) or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for validating compatibility of IGDs as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, computing devices, PLCs, IGDs, industrial communication protocols, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured:
   to receive a request to perform validation of a compatibility of a gateway device manufactured by a first vendor for operation at a designated industrial site that utilizes software of a second vendor, the request specifying a first one of a plurality of different communication protocols for use in communicating with the gateway device as part of the validation of the compatibility of the gateway device;

to select, from a database, a dataset for use in validating the compatibility of the gateway device, the dataset comprising data collected utilizing a second one of the plurality of different communication protocols via one or more programmable logic controllers during operation of one or more sets of industrial equipment at one or more industrial sites, the one or more programmable logic controllers utilizing at least one of different hardware and different software than the gateway device, the selected dataset being stored in the database in a communication protocol-agnostic format;

to convert the selected dataset from the communication protocol-agnostic format to the first communication protocol;

to operate the gateway device, in a non-production environment prior to deployment of the gateway device at the designated industrial site, utilizing the selected dataset converted from the communication protocol-agnostic format to the first communication protocol; and to validate the compatibility of the gateway device for operation at the designated industrial site that utilizes the software of the second vendor based at least in part on monitoring operation of the gateway device utilizing the selected dataset converted from the communication protocol-agnostic format to the first communication protocol.

2. The apparatus of claim 1 wherein the gateway device comprises an industrial gateway device configured for communication with a given set of industrial equipment at the designated industrial site.

3. The apparatus of claim 1 wherein the database comprises a plurality of datasets collected via a plurality of programmable logic controllers during operation of a plurality of sets of industrial equipment at a plurality of industrial sites, the plurality of industrial sites including at least one industrial site other than the designated industrial site.

4. The apparatus of claim 1 wherein the selected dataset comprises (i) a first set of data characterizing normal operation of a given one of the one or more sets of industrial equipment at a given one of the one or more industrial sites and (ii) a second set of data characterizing one or more process instabilities for operation of the given set of industrial equipment at the given one of the one or more industrial sites, and wherein validating the compatibility of the gateway device for operation at the designated industrial site utilizing the software of the second vendor comprises validating compatibility while operating the gateway device, in the non-production environment prior to deployment of the gateway device at the designated industrial site, utilizing both the first set of data and the second set of data.

5. The apparatus of claim 1 wherein the request comprises a request to validate compatibility of at least one of hardware and software of the gateway device with the software of the second vendor that is utilized at the designated industrial site.

6. The apparatus of claim 1 wherein the the second vendor comprises an independent software vendor different than the first vendor.

7. The apparatus of claim 1 wherein the software of the second vendor comprises industrial Internet of Things management software providing device and data management for one or more industrial Internet of Things devices deployed at the designated industrial site.

8. The apparatus of claim 1 wherein the designated industrial site comprises at least one of a power generation facility, a water treatment facility, a gas refinery facility, and a manufacturing facility.

9. The apparatus of claim 1 wherein the selected dataset was previously collected from at least a given one of the one or more programmable logic controllers deployed at the designated industrial site.

10. The apparatus of claim 1 wherein the request comprises a request to validate compatibility of the gateway device with a current configuration of a given set of industrial equipment deployed at the designated industrial site.

11. The apparatus of claim 1 wherein the request comprises a request to validate compatibility of the gateway device with one or more proposed changes to a current configuration of a given set of industrial equipment deployed at the designated industrial site.

12. The apparatus of claim 1 wherein the request comprises a request to validate compatibility of the gateway device with one or more simulated processes for operating a given set of industrial equipment deployed at the designated industrial site.

13. The apparatus of claim 1 wherein monitoring the operation of the gateway device utilizing the selected dataset converted from the communication protocol-agnostic format to the first communication protocol comprises determining trend information for one or more selected key performance indicators and outputting one or more visualizations characterizing the determined trend information for the one or more selected key performance indicators.

14. A non-transitory processor-readable storage medium having stored therein program code of one or more software programs, wherein the program code when executed by at least one processing device causes the at least one processing device:

to receive a request to perform validation of a compatibility of a gateway device manufactured by a first vendor for operation at a designated industrial site that utilizes software of a second vendor, the request specifying a first one of a plurality of different communication protocols for use in communicating with the gateway device as part of the validation of the compatibility of the gateway device;

to select, from a database, a dataset for use in validating the compatibility of the gateway device, the dataset comprising data collected utilizing a second one of the plurality of different communication protocols via one or more programmable logic controllers during operation of one or more sets of industrial equipment at one or more industrial sites, the one or more programmable logic controllers utilizing at least one of different hardware and different software than the gateway device, the selected dataset being stored in the database in a communication protocol-agnostic format;

to convert the selected dataset from the communication protocol-agnostic format to the first communication protocol;

to operate the gateway device, in a non-production environment prior to deployment of the gateway device at the designated industrial site, utilizing the selected dataset converted from the communication protocol-agnostic format to the first communication protocol; and to validate the compatibility of the gateway device for operation at the designated industrial site that utilizes the software of the second vendor based at least in part on monitoring operation of the gateway device utilizing the selected dataset converted from the communication protocol-agnostic format to the first communication protocol.

15. The non-transitory processor-readable storage medium of claim 14 wherein the request comprises a request to validate compatibility of at least one of hardware and software of the gateway device with the software of the second vendor that is utilized at the designated industrial site.

16. The non-transitory processor-readable storage medium of claim 14 wherein the request comprises at least one of:
- a request to validate compatibility of the gateway device with a current configuration of a given set of industrial equipment deployed at the designated industrial site;
- a request to validate compatibility of the gateway device with one or more proposed changes to the current configuration of the given set of industrial equipment deployed at the designated industrial site; and
- a request to validate compatibility of the gateway device with one or more simulated processes for operating the given set of industrial equipment deployed at the designated industrial site.

17. A method comprising:

receiving a request to perform validation of a compatibility of a gateway device manufactured by a first vendor for operation at a designated industrial site that utilizes software of a second vendor, the request specifying a first one of a plurality of different communication protocols for use in communicating with the gateway device as part of the validation of the compatibility of the gateway device;

selecting, from a database, a dataset for use in validating the compatibility of the gateway device, the dataset comprising data collected utilizing a second one of the plurality of different communication protocols via one or more programmable logic controllers during operation of one or more sets of industrial equipment at one or more industrial sites, the one or more programmable logic controllers utilizing at least one of different hardware and different software than the gateway device, the selected dataset being stored in the database in a communication protocol-agnostic format;

converting the selected dataset from the communication protocol-agnostic format to the first communication protocol;

operating the gateway device, in a non-production environment prior to deployment of the gateway device at the designated industrial site, utilizing the selected dataset converted from the communication protocol-agnostic format to the first communication protocol; and validating the compatibility of the gateway device for operation at the designated industrial site that utilizes the software of the second vendor based at least in part on monitoring operation of the gateway device utilizing the selected dataset converted from the communication protocol-agnostic format to the first communication protocol;

wherein the method is performed by at least one processing device comprising a processor coupled to a memory.

18. The method of claim 17 wherein the request comprises a request to validate compatibility of at least one of hardware and software of the gateway device with the software of the second vendor that is utilized at the designated industrial site.

19. The method of claim 17 wherein the request comprises at least one of:
- a request to validate compatibility of the gateway device with a current configuration of a given set of industrial equipment deployed at the designated industrial site;
- a request to validate compatibility of the gateway device with one or more proposed changes to the current configuration of the given set of industrial equipment deployed at the designated industrial site; and
- a request to validate compatibility of the gateway device with one or more simulated processes for operating the given set of industrial equipment deployed at the designated industrial site.

20. The method of claim 17 wherein the software of the second vendor comprises industrial Internet of Things management software providing device and data management for one or more industrial Internet of Things devices deployed at the designated industrial site.

* * * * *